(12) United States Patent
Wright

(10) Patent No.: US 6,752,405 B1
(45) Date of Patent: Jun. 22, 2004

(54) CONVERTIBLE TWIN/SINGLE SEAT STROLLER

(76) Inventor: Lindsay J. Wright, 58 Hermiston Avenue, London (GB), N8 8NP (*) Notice: Subject to any disclaimer, the term of this patent is extended or adjusted under 35 U.S.C. 154(b) by 6 days.

(21) Appl. No.: 10/200,621

(22) Filed: Jul. 23, 2002

(51) Int. Cl.$^7$ .................................................. B62B 7/12
(52) U.S. Cl. .................................... 280/47.38; 280/642
(58) Field of Search ............................. 280/47.38, 647, 280/642, 643, 646, 648, 649, 650, 43, 38

(56) References Cited

U.S. PATENT DOCUMENTS

| | | | | |
|---|---|---|---|---|
| 4,725,071 A | * | 2/1988 | Shamie | 280/643 |
| D296,540 S | * | 7/1988 | Perego | D12/129 |
| 5,221,106 A | * | 6/1993 | Shamie | 280/644 |
| 5,338,096 A | * | 8/1994 | Huang | 297/243 |
| 5,522,121 A | * | 6/1996 | Fraynd et al. | 24/335 |
| 5,918,892 A | * | 7/1999 | Aaron et al. | 280/47.38 |
| 6,209,892 B1 | * | 4/2001 | Schaaf et al. | 280/33.993 |
| 6,267,406 B1 | * | 7/2001 | Huang | 280/647 |
| 6,527,294 B1 | * | 3/2003 | Brewington et al. | 280/647 |

FOREIGN PATENT DOCUMENTS

GB      2193692 A   *  2/1988   ............. B62B/7/12

* cited by examiner

Primary Examiner—Brian L. Johnson
Assistant Examiner—J. Allen Shriver

(57) ABSTRACT

A convertible twin/single seat stroller for providing a two-in-one stroller which can be expanded to carry two children and contracted to carry only one child. The convertible twin/single seat stroller includes a frame assembly including front leg members and rear leg members, and also including cross members interconnecting the front and rear leg members; and also includes a wheel assembly being mounted to the front and rear leg members; and further includes handle members being mounted to the frame assembly; and also includes seat members being supported upon the frame assembly; and further includes a coupler for converting and securing a twin seat stroller to a single seat stroller.

4 Claims, 5 Drawing Sheets

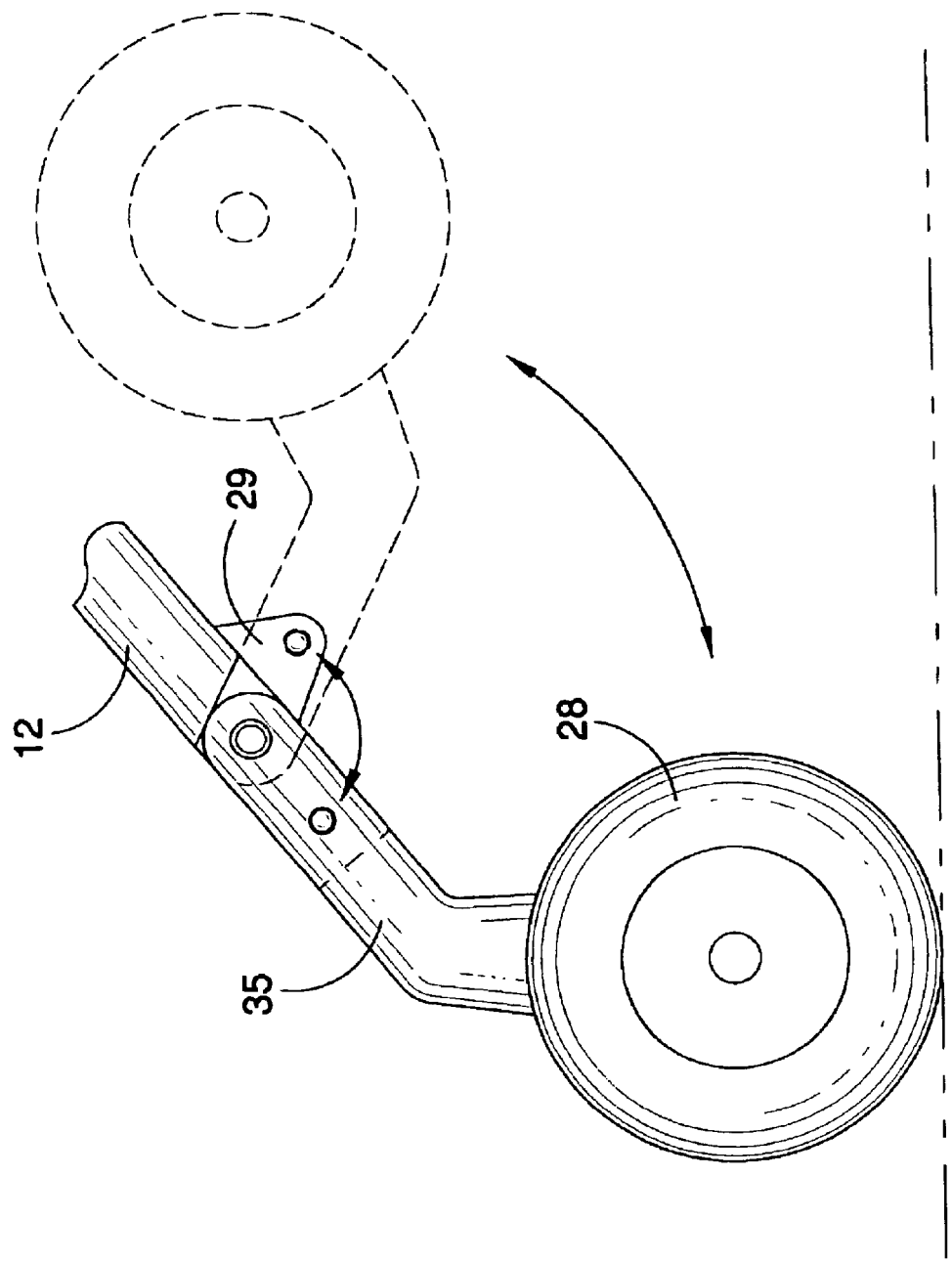

CONVERTIBLE TWIN/SINGLE SEAT STROLLER

BACKGROUND OF THE INVENTION

1. Field of the Invention

The present invention relates to convertible two-to-one seat strollers and more particularly pertains to a new convertible twin/single seat stroller for providing a two-in-one stroller which can be expanded to carry two children and contracted to carry only one child.

2. Description of the Prior Art

The use of convertible two-to-one seat strollers is known in the prior art. More specifically, convertible two-to-one seat strollers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,725,071; 5,221,106; 5,230,523; 2,993,702; and U.S. Pat. No. Des. 296,540.

While these devices fulfill their respective, particular objectives and requirements, the aforementioned patents do not disclose a new convertible twin/single seat stroller. The prior art describes inventions having frames mounted upon wheels and also having handles and seat members being supported upon the frames, and further having front-to-back tandem seat strollers.

SUMMARY OF THE INVENTION

The general purpose of the present invention, which will be described subsequently in greater detail, is to provide a new convertible twin/single seat stroller which has many of the advantages of the convertible two-to-one seat strollers mentioned heretofore and many novel features that result in a new convertible twin/single seat stroller which is not anticipated, rendered obvious, suggested, or even implied by any of the prior art convertible two-to-one seat strollers, either alone or in any combination thereof. The present invention includes a frame assembly including front leg members and rear leg members, and also including cross members interconnecting the front and rear leg members; and also includes a wheel assembly being mounted to the front and rear leg members; and further includes handle members being mounted to the frame assembly; and also includes seat members being supported upon the frame assembly; and further includes a coupler for converting and securing a twin seat stroller to a single seat stroller. None of the prior art includes side-by-side seat members with one of the seat members being collapsible to form a single seating stroller.

There has thus been outlined, rather broadly, the more important features of the convertible twin/single seat stroller in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new convertible twin/single seat stroller which has many of the advantages of the convertible two-to-one seat strollers mentioned heretofore and many novel features that result in a new convertible twin/single seat stroller which is not anticipated, rendered obvious, suggested, or even implied by any of the prior art convertible two-to-one seat strollers, either alone or in any combination thereof.

Still another object of the present invention is to provide a new convertible twin/single seat stroller for providing a two-in-one stroller which can be expanded to carry two children and contracted to carry only one child.

Still yet another object of the present invention is to provide a new convertible twin/single seat stroller that is easy and convenient to set up and use.

Even still another object of the present invention is to provide a new convertible twin/single seat stroller that is much easier to manipulate than a two-seat tandem stroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a detailed side elevational view of one of the wheels of the present invention.

DESCRIPTION OF THE PREFERRED EMBODIMENT

Figure 1:
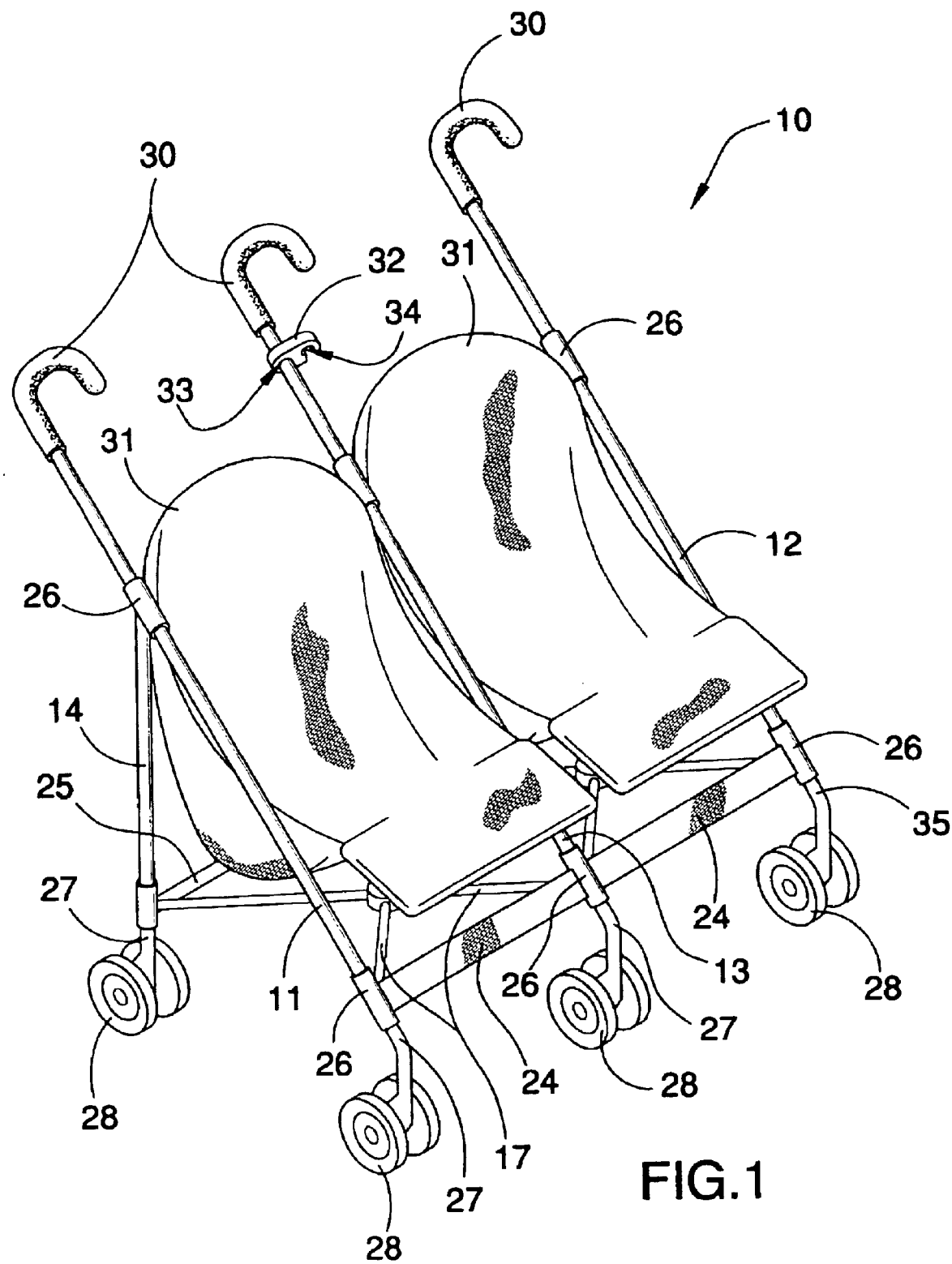
FIG. 1 is a perspective view of a new convertible twin/single seat stroller according to the present invention.
Figure 2:
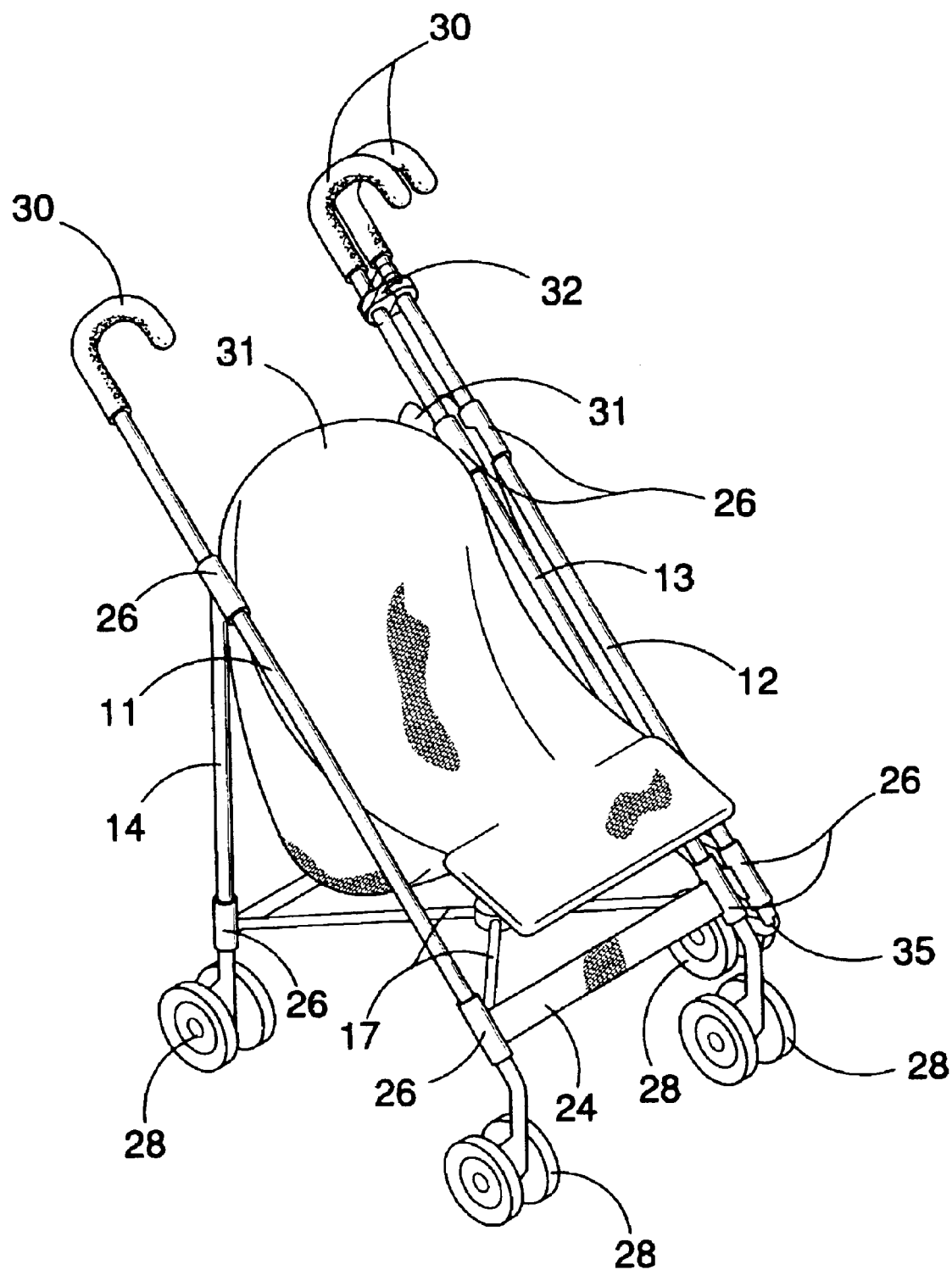
FIG. 2 is another perspective view of the present invention.
Figure 3:
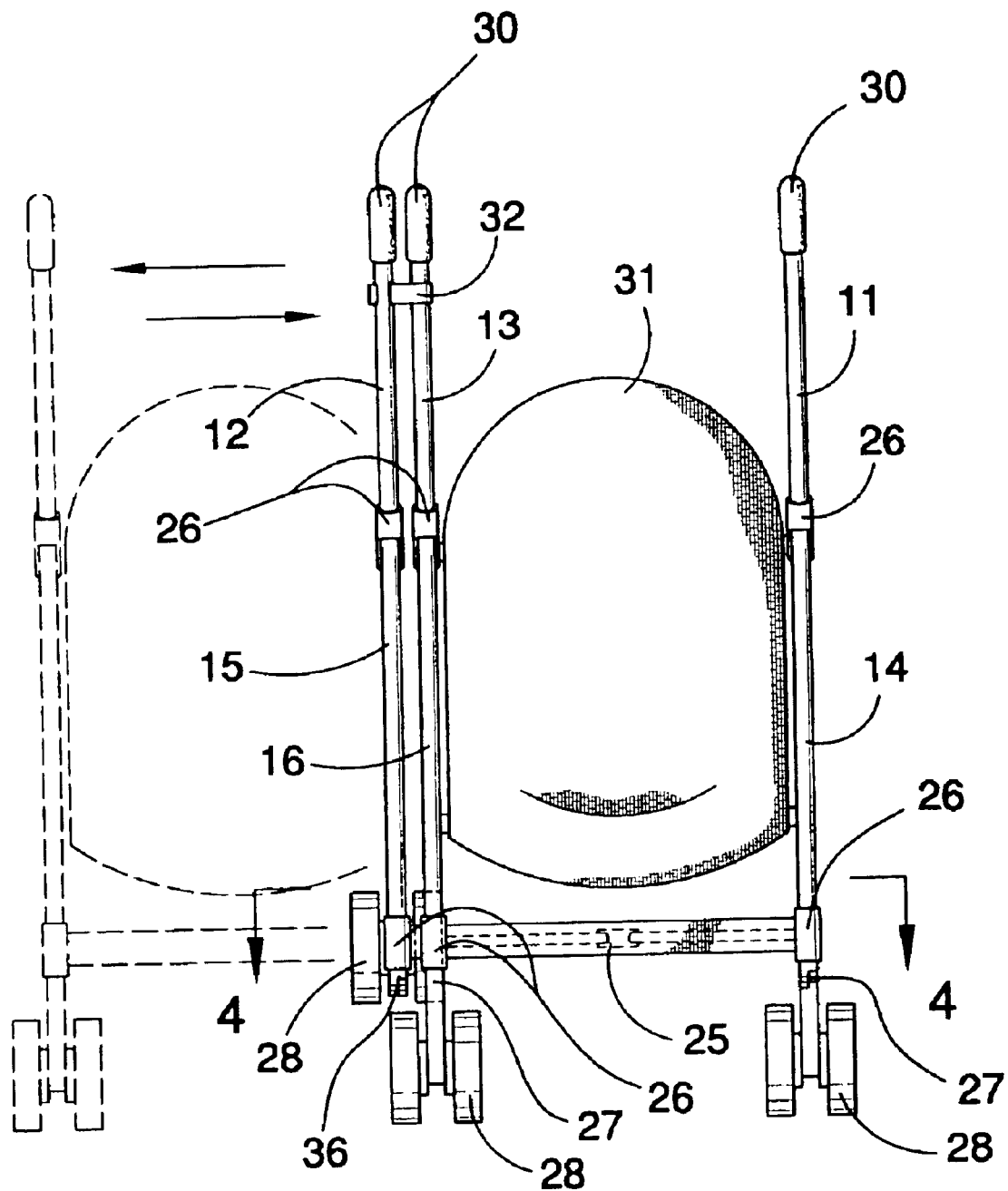
FIG. 3 is a rear elevational view of the present invention.
Figure 4:
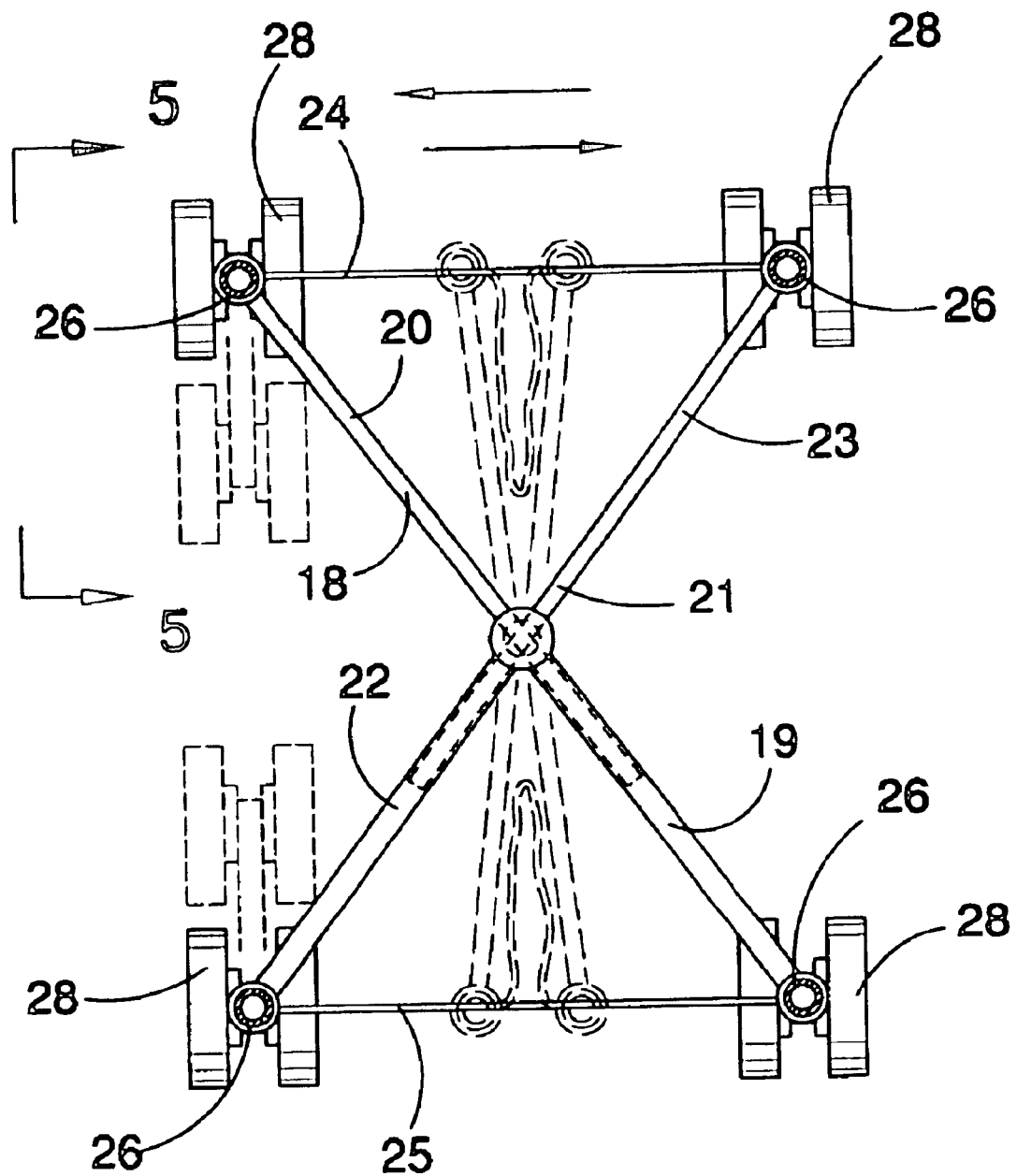
FIG. 4 is a cross-sectional view of the present invention.

With reference now to the drawings, and in particular to FIGS. 1 through 5 thereof, a new convertible twin/single seat stroller embodying the principles and concepts of the present invention and generally designated by the reference numeral 10 will be described.

As best illustrated in FIGS. 1 through 5, the convertible twin/single seat stroller 10 generally comprises a frame assembly including front leg members 11–13 and rear leg members 14–16, and also including cross members 17,18,21 conventionally interconnecting the front and rear leg members 11–16. The frame assembly further includes connectors 26 being mounted to the front and rear leg members 11–16. The connectors 26 are sleeves being securely and conventionally mounted about the front and rear leg members 11–16. The frame assembly also includes bands 24,25 being conventionally attached to the front and rear leg members 11–16. The bands 24,25 includes first bands 24 which are securely attached to the sleeves 26 being attached to the front leg members 11–13, and also includes second bands which are securely attached to the sleeves 26 being attached to the rear leg members 14–16. The rear leg members 14–16 are conventionally attached to the sleeves 26 being attached to the front leg members 11–13. The front leg members 11–13 includes an intermediate front leg member 13 and a pair of outer front leg members 11,12 with one of the outer front leg members 12 being collapsible upon the intermediate front leg member 13. The rear leg members 14–16 include an intermediate rear leg member 16 and a pair of outer rear leg members 14,15 with one of the outer rear leg members 15 being collapsible upon the intermediate rear leg member 16. The cross members 17,18,21 include first and second cross members 18,21 being pivotally and conventionally attached to and crisscrossing one another. The first cross member 18 has ends being conventionally attached to the collapsible outer front leg member 12 and to the intermediate rear leg member 16. The second cross member 21 has ends being conventionally attached to the collapsible outer rear leg member 15 and to the intermediate front leg member 13. Each of the first and second cross members 18,21 includes a tubular member 19,22 having an open end and a bore extending therein, and also includes a shaft 20,23 being movably disposed inwardly and outwardly of the tubular member 19,22 to allow the collapsible outer front and rear leg members 12,15 to collapse upon the intermediate front and rear leg members 13,16.

A wheel assembly is conventionally mounted to the front and rear leg members 11–16. The wheel assembly includes wheel support members 27,35,36 being conventionally mounted to bottom ends of the front and rear leg members 11–16, and also includes wheels 28 being rotatably and conventionally mounted to the wheel support members 27,35,36. The wheel support members 27,35,36 include first and second wheel support members 35,36 with the first wheel support member 35 being pivotally and lockingly attached with a fastener to the collapsible outer front leg member 12, and with the second wheel support member 36 pivotally and lockingly attached with another fastener to the collapsible outer rear leg member 15. The wheel assembly further includes brackets 29 being conventionally attached to the collapsible outer front and rear leg members 12,15 for securing the wheels 28 in a retracted position when the convertible twin/single set stroller 10 is converted from a twin seat to a single seat stroller. Handle members 30 are conventionally mounted to the frame assembly.

Seat members 31 are conventionally supported upon the frame assembly. The seat members 31 are sheets of material and includes a first seat member which is supported upon one of the outer front and rear leg members 11,14 and upon the intermediate front and rear leg members 13,16, and also includes a second seat member which is supported upon the collapsible outer front and rear leg members 12,15 and upon the intermediate front and rear leg members 13,16.

A coupler 32 for converting a two-seat stroller to a single seat stroller is a planar member having a pair of slots 33,34 being disposed therein through an edge thereof. The coupler 32 is engagably mounted to the intermediate front leg member 13 and is engagably attachable to the collapsible outer front leg member 12 to securely fasten the collapsible outer front leg member 12 to the intermediate front leg member 13 to convert the stroller from a twin-seat stroller to a single seat stroller.

In use, the user expands and conventionally secures the shafts 20,23 from the tubular members 19,22 of the first and second cross members 18,21 and unfastens the first and second wheel support members 35,36 from the brackets 29 and fastens the first and second wheel support members 35,36 to the collapsible outer front and rear leg members 12,15 to set up the twin seat stroller. To set up the single seat stroller, the user unfastens the first and second wheel support members 35,36 from the collapsible outer front and rear leg members 12,15 and fastens the first and second wheel support members 35,36 to the brackets 29, and retracts the shafts 20,23 into the tubular members 19,22 of the first and second cross members 18,21, and couples the coupler 33 to the collapsible outer front leg member 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the convertible twin/single seat stroller. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A convertible twin/single seat stroller comprising:
   a frame assembly including front leg members and rear leg members, and also including length-adjustable cross members interconnecting said front and rear leg members, said frame assembly further including connectors being mounted to said front and rear leg members, said connectors being sleeves being securely mounted about said front and rear leg members, said frame assembly also including bands being attached to said front and rear leg members, said bands including first bands which are securely attached to said sleeves being attached to said front leg members, and also including second bands which are securely attached to said sleeves being attached to said rear leg members;
   a wheel assembly being mounted to said front and rear leg members;
   handle members being mounted to said frame assembly;
   seat members being supported upon said frame assembly; and
   a coupler for converting a two-seat stroller to a single seat stroller.

2. A convertible twin/single seat stroller comprising:
   a frame assembly including front leg members and rear leg members, and also including length-adjustable cross members interconnecting said front and rear leg members, said frame assembly further includes connectors being mounted to said front and rear leg members, said connectors being sleeves being securely mounted about said front and rear leg members, said rear leg members being attached to a pair of said sleeves being attached to said front leg members, said front leg members including an intermediate front leg member and a pair of outer front leg members, one of said outer front leg members being collapsible upon said intermediate front leg member, said rear leg members including an intermediate rear leg member and a pair of outer rear leg members, one of said outer rear leg members being collapsible upon said intermediate rear leg member, said cross members including first and second cross members being pivotally attached to and crisscrossing one another, said first cross member having ends being attached to the collapsible said outer front leg member and to said intermediate rear leg member, said second cross member having ends being attached to the collapsible said outer rear leg member and to said intermediate front leg member, each of said first and second cross members including a tubular member having an open end and a bore extending therein, and also including a shaft being movably disposed inwardly and outwardly of said tubular member to allow one each of said outer front and rear leg members to collapse upon said intermediate front and rear leg members;

a wheel assembly being mounted to said front and rear leg members, said wheel assembly including wheel support members being mounted to bottom ends of said front and rear leg members, and also including wheels being rotatably mounted to said wheel support members, said wheel support members including first and second wheel support members, said first wheel support member being pivotally and lockingly attached with a fastener to the collapsible said outer front leg member, said second wheel support member being pivotally and lockingly attached with another fastener to the collapsible said outer rear leg member, said wheel assembly further including brackets being attached to the collapsible said outer front and rear leg members for securing said wheels in a retracted position when said convertible twin/single seat stroller is converted from a twin seat to a single seat strollers;

handle members being mounted to said frame assembly;

seat members being supported upon said frame assembly; and a coupler for converting a two-seat stroller to a single seat stroller.

3. A convertible twin/single seat stroller as described in claim 2, wherein said seat members are sheets of material and includes a first seat member which is supported upon one of said outer front and rear leg members and upon said intermediate front and rear leg members, and also includes a second seat member which is supported upon another of said outer front and rear leg members and upon said intermediate front and rear leg members.

4. A convertible twin/single seat stroller as described in claim 3, wherein said coupler is a planar member having a pair of slots being disposed therein through an edge thereof, said coupler being engageably mounted to said intermediate front leg member and being engageable attachable to the collapsible said outer front leg member to securely fasten said outer front leg member to said intermediate front leg member to convert said stroller from a twin-seat stroller to a single seat stroller.

* * * * *